United States Patent
Cui et al.

(10) Patent No.: US 12,309,613 B2
(45) Date of Patent: May 20, 2025

(54) UPLINK BEAM TRAINING ON NEIGHBOR CELL

(71) Applicant: APPLE INC., Cupertino, CA (US)

(72) Inventors: Jie Cui, Cupertino, CA (US); Dawei Zhang, Cupertino, CA (US); Haitong Sun, Cupertino, CA (US); Hong He, Cupertino, CA (US); Huaning Niu, Cupertino, CA (US); Manasa Raghavan, Cupertino, CA (US); Qiming Li, Beijing (CN); Xiang Chen, Cupertino, CA (US); Yang Tang, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 403 days.

(21) Appl. No.: 17/820,899

(22) Filed: Aug. 19, 2022

(65) Prior Publication Data
US 2023/0099761 A1 Mar. 30, 2023

Related U.S. Application Data

(60) Provisional application No. 63/261,587, filed on Sep. 24, 2021.

(51) Int. Cl.
| | |
|---|---|
| *H04W 16/28* | (2009.01) |
| *H04L 5/00* | (2006.01) |
| *H04W 24/10* | (2009.01) |
| *H04W 36/08* | (2009.01) |

(52) U.S. Cl.
CPC .......... *H04W 16/28* (2013.01); *H04L 5/0051* (2013.01); *H04W 24/10* (2013.01); *H04W 36/085* (2023.05)

(58) Field of Classification Search
CPC ... H04W 16/28; H04W 24/10; H04W 36/085; H04L 5/0051
See application file for complete search history.

(56) References Cited

U.S. PATENT DOCUMENTS

| | | | |
|---|---|---|---|
| 2013/0065622 A1* | 3/2013 | Hwang | H04B 7/024 455/500 |
| 2021/0167821 A1 | 6/2021 | Chen et al. | |
| 2022/0312351 A1* | 9/2022 | Cui | H04W 56/0045 |
| 2023/0239123 A1* | 7/2023 | Zhou | H04L 5/0023 370/329 |

OTHER PUBLICATIONS

Nokia, Nokia Shanghai Bell, "Multi-cell support for multi-TRP and L1 mobility", R2-2104988, 3GPP TSG-RAN WG2 Meeting #114 Electronic, Elbonia, Agenda Item 8.17.2, May 19-27, 2021, 13 pages.
OPPO, "Enhancements on Multi-Beam Operation", R1-2102378, 3GPP TSG RAN WG1 #104b-e, e-Meeting, Agenda Item 8.1.1, Apr. 12-20, 2021, 20 pages.

* cited by examiner

*Primary Examiner* — Mohammad S Anwar
(74) *Attorney, Agent, or Firm* — Dorsey & Whitney LLP

(57) ABSTRACT

Systems and methods are provided for a user equipment to train a transmit beam of a transmission configuration indication (TCI) for a non-serving cell. A system may use uplink (UL) reference signal (RS) based transmit (Tx) beam training with a target non-serving cell. The Target non-serving cell may measure the UL RS and determine a best Tx beam. The system may coordinate information regarding the best Tx beam to update a TCI at the UE for the target non-serving cell.

20 Claims, 7 Drawing Sheets

UPLINK BEAM TRAINING ON NEIGHBOR CELL

TECHNICAL FIELD

This application relates generally to wireless communication systems.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
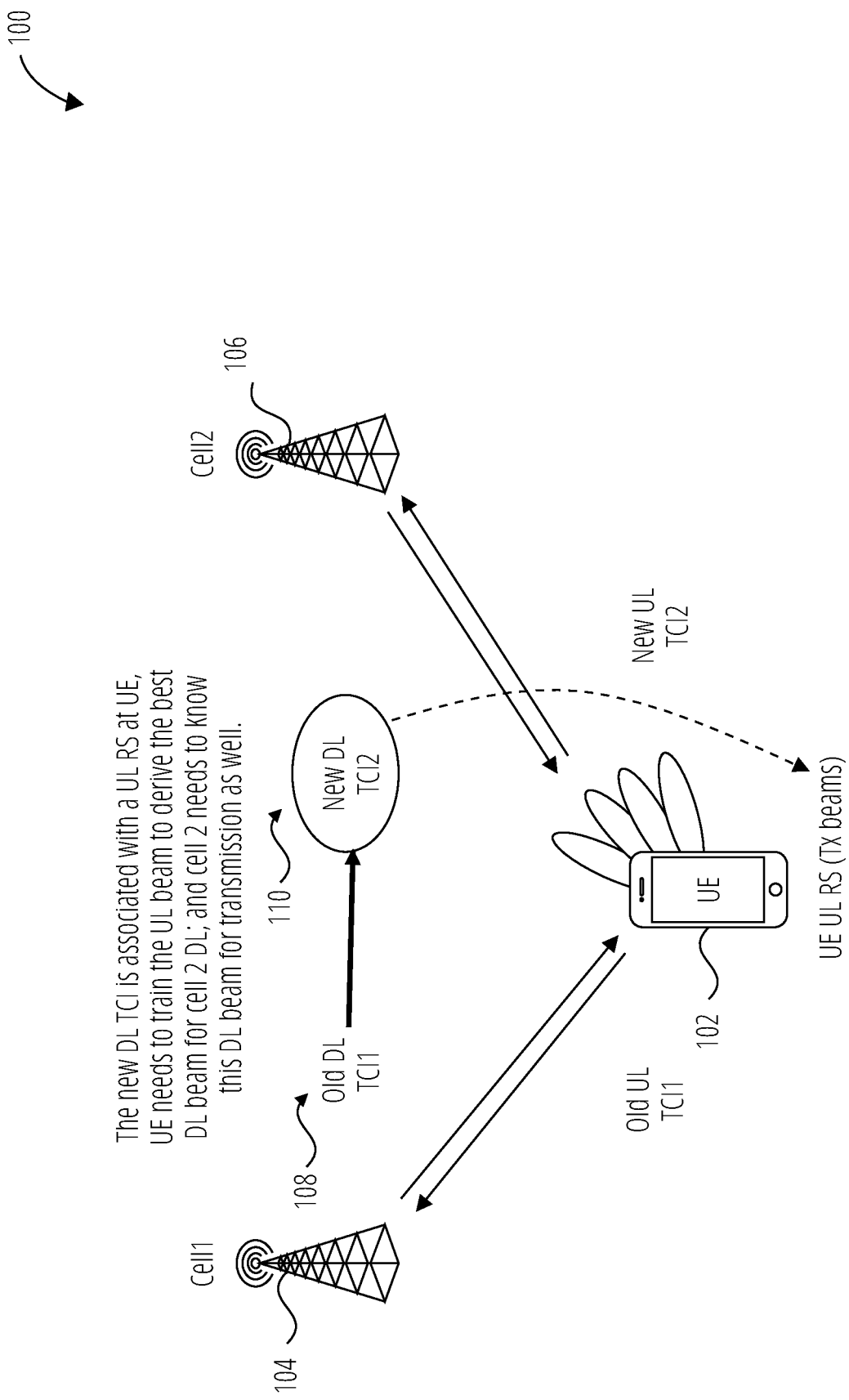
FIG. 1A and FIG. 1B show a UE in communication with a first cell and a second cell in accordance with one embodiment.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

A wireless network may configure a UE in a connected state to perform measurements and report the measurement results according to a measurement configuration. The measurement configuration may be provided by dedicated signaling. The measurement configuration may define, for example, measurement objects, reporting configurations, measurement gaps, and other parameters. For each measurement type (e.g., intra-frequency, inter-frequency, and inter-RAT), the measurement configuration may define one or more measurement object (MO). In NR, each MO may indicate frequency, timing, and subcarrier spacing of reference signals to be measured. When configured by the network, the UE may be able to perform Layer 1 reference signal received power (L1-RSRP) or Layer 1 signal-to-noise and interference ratio (L1-SINR) measurements of synchronization signal blocks (SSB), channel state information reference signal (CSI-RS), or both.

In certain systems, Layer 1 (L1 or Physical Layer) or Layer 2 (L2 or Media Access Control (MAC) Layer) signaling may trigger handover between transmission reception points (TRPs) within a cell or between cells. Thus, a UE may be configured to measure serving cell and non-serving cell L1-RSRP or L1-SINR and to provide L1 and L2 reporting for L1/L2 mobility. The network may change a transmission configuration indication (TCI) based on the reported L1-RSRP or L1-RSRP measurements to cause the UE to change from a current serving cell to a target non-serving cell.

Generally, a UE may send L1 measurement reports (e.g., L1-RSRP, L1-SINR) for report configurations configured by the network. The UE may use periodic reporting, semi-persistent reporting, or aperiodic reporting. The UE may send periodic L1-RSRP measurement reports for an active bandwidth part (BWP). The UE transmits the periodic L1-RSRP reporting on a physical uplink control channel (PUCCH) over the air interface according to a predefined periodicity. For L1/L2 mobility, the network may configure periodical L1-RSRP and/or Layer 1 reference signal received quality (R1-RSRQ) measurement report for both serving and non-serving cells from the UE. However, the periodic reporting may take too much signaling resources and occupy too much uplink (UL) channel resources, especially if the UE is monitoring many non-serving cells.

Certain systems (e.g., 3GPP Release 17 or R17) with further enhanced multiple-input-multiple-output (FeMIMO) may include L1 and/or L2 mobility (herein referred to as L1/L2 mobility) to change the cell by changing the TCI via L1 downlink control information (DCI) or L2 MAC control element (CE) command from the network. Previously a TCI change was only used for a UE to move within a cell. Stays with cell. Systems that support L1/L2 mobility may allow the UE may change from one cell to another cell by changing the TCI. For example, a serving cell may be associated with a first TCI and a non-serving cell may be associated with a second TCI. Instead of using a legacy handover, the serving cell may instruct the UE to change cells, and the UE may change to the non-serving cell by using the second TCI.

In such systems, the L1/L2 mobility measurement could be performed for the non-serving cell, which includes intra-frequency L1/L2 mobility measurement and inter-frequency L1/L2 mobility measurement. An intra-frequency L1/L2 mobility measurement includes a measurement on L1 or L2 on a same frequency on a first cell and a second cell. An inter-frequency L1/L2 mobility measurement includes a measurement on L1 or L2 on a different frequency on a first cell and a second cell.

If the UE active BWP cannot contain the target cell reference signal (RS) for L1/L2 mobility measurement, the UE may need to use measurement gap (MG) or scheduling restriction to perform the measurement. Some embodiments herein include use of a MG or scheduling restrictions for the L1/L2 mobility measurements.

The UE may perform L1/L2 mobility measurements for the downlink (DL) TCI to train a receive (Rx) beam on the RS. The L1/L2 mobility measurements may be used to determine a downlink TCI.

In R17 the TCI can be associated with a specific UL RS, e.g., sounding reference signal (SRS). In L1/L2 mobility when the UE is indicated to change the cell by switching the TCI, the beam information in the new TCI relies on the UE UL beam training before the TCI switching. Thus, the UE may need to train the transmit (Tx) beam of the TCI for the non-serving cell.

Some embodiments herein describe methods for training the Tx beam of the TCI for the non-serving cell. For example, the UE may transmit SRS using a beam sweeping pattern to the non-serving network node. The non-serving network node may measure the SRS for the beams and determine a best SRS measurement. The network may provide an indication to the UE of the Tx beam with the best SRS measurement. The UE may switch to a TCI based on the indication. The PUCCH/SRS can have TCI, but TCI is associated with SSB or CSI-RS. Some embodiments herein describe methods in which a TCI may be associated with an UL RS.

For the target TCI to be associated with an uplink (UL) RS, e.g. SRS, the network may need to coordinate with the UE for Tx beam training. There may be two types of TCI configurations: separate TCI, and joint TCI. A separate TCI refers to a scenario where there is a DL TCI and an UL TCI. A joint TCI refers to a scenario where the TCI is only associated with a DL RS.

For a separate TCI, there may need to be coordination between the network and the UE to determine both the DL TCI and the UL TCI. The target DL TCI may be associated with an UL RS. The target UL TCI may be associated with an UL RS or a DL RS. For example, FIG. 1A and FIG. 1B show a UE 102 in communication with a first cell 104 (Cell1) and a second cell 106 (Cell2).

FIG. 1A illustrates a network 100 using L1/L2 mobility where a DL TCI is associated with an UL RS. The UE 102 may be in communication with the first cell 104, and the first cell may indicate to the UE 102 to change to the second cell 106. To perform the cell change using L1/L2 mobility, the UE 102 switches which DL TCI is used. To train the UL beam, the UE 102 may use beam sweeping and coordination with the network nodes as described with reference to FIG. 2 and FIG. 3. Based on the result of the beam sweeping, the UE 102 may determine the new DL TCI2 110 and change from using the old DL TCI1 108 to the new DL TCI2 110.

As shown in FIG. 1A, the new DL TCI2 110 for the second cell 106 may be associated with an UL RS at a UE 102. The UE 102 may need to train the UL beam to derive the best DL beam for DL from the second cell 106. To train the UL beam, the UE 102 may use beam sweeping and coordination with the network nodes as described with reference to FIG. 2 and FIG. 3. Based on the result of the beam sweeping, the UE 102 may determine and use the new DL TCI2 110 for future DL communication. The second cell 106 may also be informed of this DL beam for transmission.

Figure 1B:
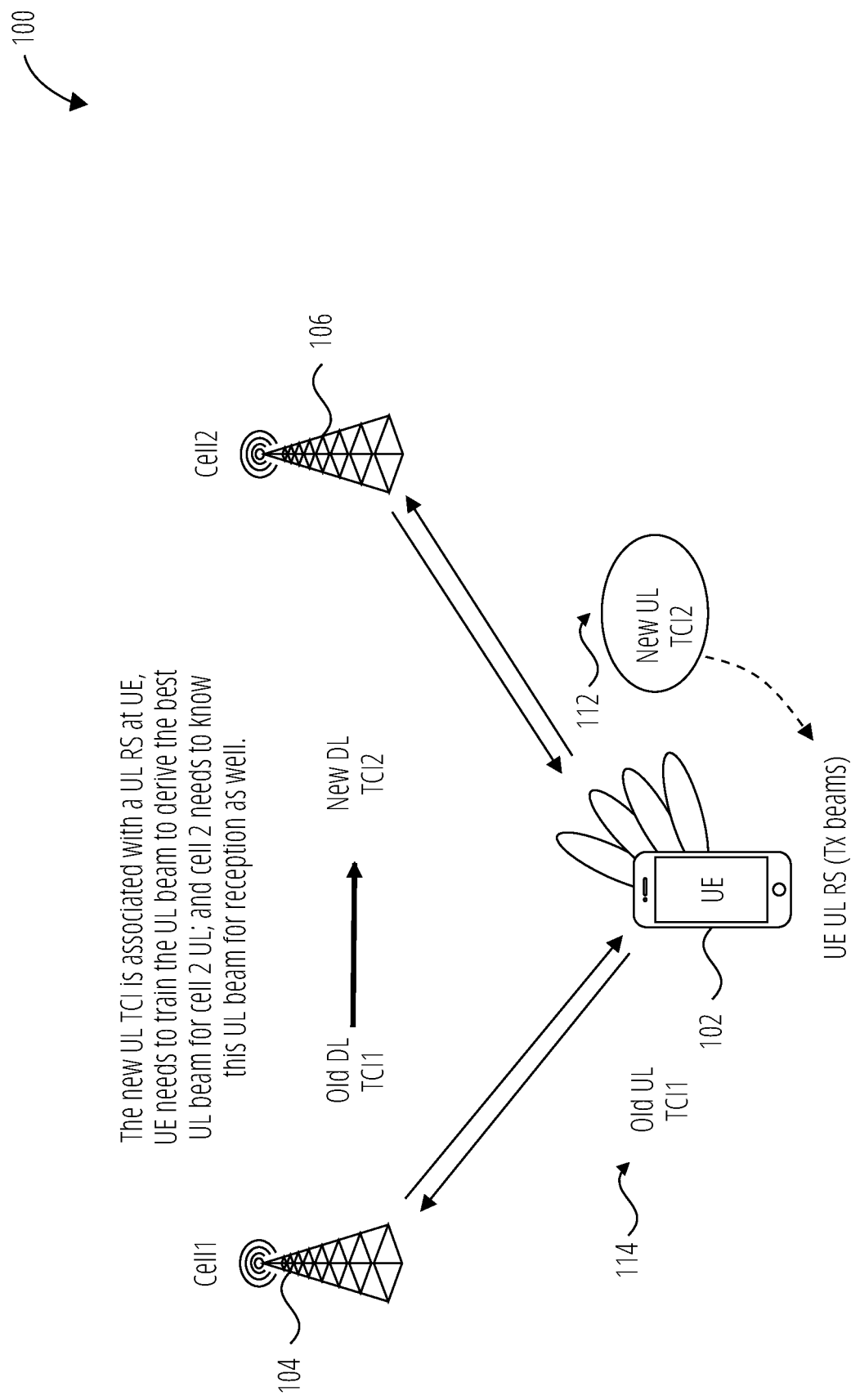

FIG. 1B illustrates a network 100 using L1/L2 mobility where an UL TCI is associated with an UL RS. The UE 102 may be in communication with the first cell 104, and the first cell may indicate to the UE 102 to change to the second cell 106. To perform the cell change using L1/L2 mobility, the UE 102 switches which UL TCI is used in addition to the DL TCI shown in FIG. 1A.

As shown in FIG. 1B, the new UL TCI 112 may be associated with a UL RS at the UE 102. The UE 102 may need to train the UL beam to derive the best UL beam for UL to the second cell 106. To train the UL beam, the UE 102 may use beam sweeping and coordination with the network nodes as described with reference to FIG. 2 and FIG. 3. Based on the result of the beam sweeping, the UE 102 may determine the new UL TCI 112 and transition from using the old UL TCI 114 to the new UL TCI 112. The second cell 106 may also be informed of this UL beam for reception.

Figure 2:
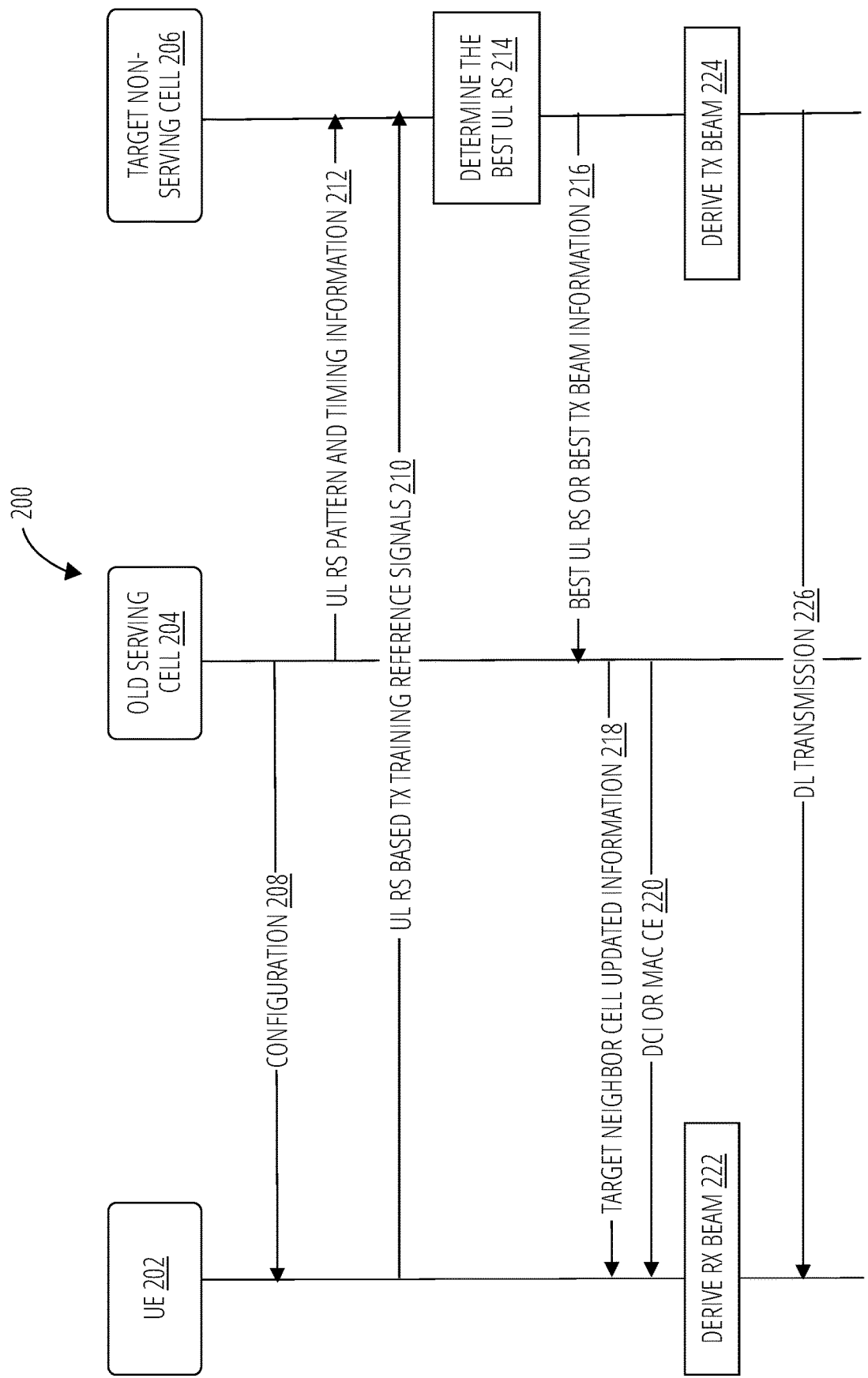
FIG. 2 illustrates a signal diagram for determining a target DL TCI associated with an UL RS in accordance with some embodiments.

FIG. 2 illustrates a signal diagram 200 for determining a target DL TCI associated with an UL RS in accordance with some embodiments. The method outlined in this signal diagram 200 may allow the network to know the DL TCI to use for a target non-serving cell 206 before triggering a cell change.

If the target TCI (e.g., DL TCI for the target non-serving cell 306) of the target non-serving cell 206 is directly or indirectly associated with a UL RS of the UE (e.g. SRS), according to one embodiment, then the following method may be performed. In a first step, the old serving cell 204 (e.g., the active serving cell) may configure the UE 202 to perform UL RS based Tx training reference signals 210 on UL to the target non-serving cell 206. For instance, as shown, the old serving cell 204 may send a configuration 208 to the UE 202. The UL RS based Tx training reference signals 210 may comprise beam sweeping using SRS on the UL. In particular, the beam sweeping may be configured to determine the best Tx beam to use for transmissions to the target non-serving cell 206. The configuration 208 may comprise UL RS pattern and/or timing information for the UE for the UL RS based Tx training reference signals 210.

The UL RS pattern and/or timing information may be adjusted based on whether an intra-frequency or an inter-frequency is used. If the target non-serving cell 206 is an intra-frequency non-serving cell or if the configured SRS is within the current UE active BWP, the UE 202 may perform the UL RS transmission with repetition (i.e., UL RS based Tx training reference signals 210) without MG (measurement gap).

If the target non-serving cell 206 is an inter-frequency non-serving cell or if the configured SRS is not within the current UE active BWP, the UE 202 may perform UL RS transmission with repetition (i.e., UL RS based Tx training reference signals 210) within MGs. The UE may switch frequencies and perform the UL RS based Tx training reference signals 210 within MGs.

The UE 202 may support per-frequency range (FR) MG. If the UE 202 supports per-FR MG, the UE 202 can perform the UL RS transmission with repetition in MG of a first FR. In this first FR, outside of the UL RS transmission with repetition in MG, no data, control transmission, or reception may be used by the UE in MG. Hover, the UE 202 may still use a second FR for used for normal data, control reception, or transmission in the MG if the UE 202 has any active serving component carrier on the second FR.

If the UE 202 does not support per-FR MG (e.g., only supports per-UE MG), the UE 202 can perform the UL RS transmission with repetition in MG and no data, control transmission, or reception is available for the UE in this MG.

Figure 4:
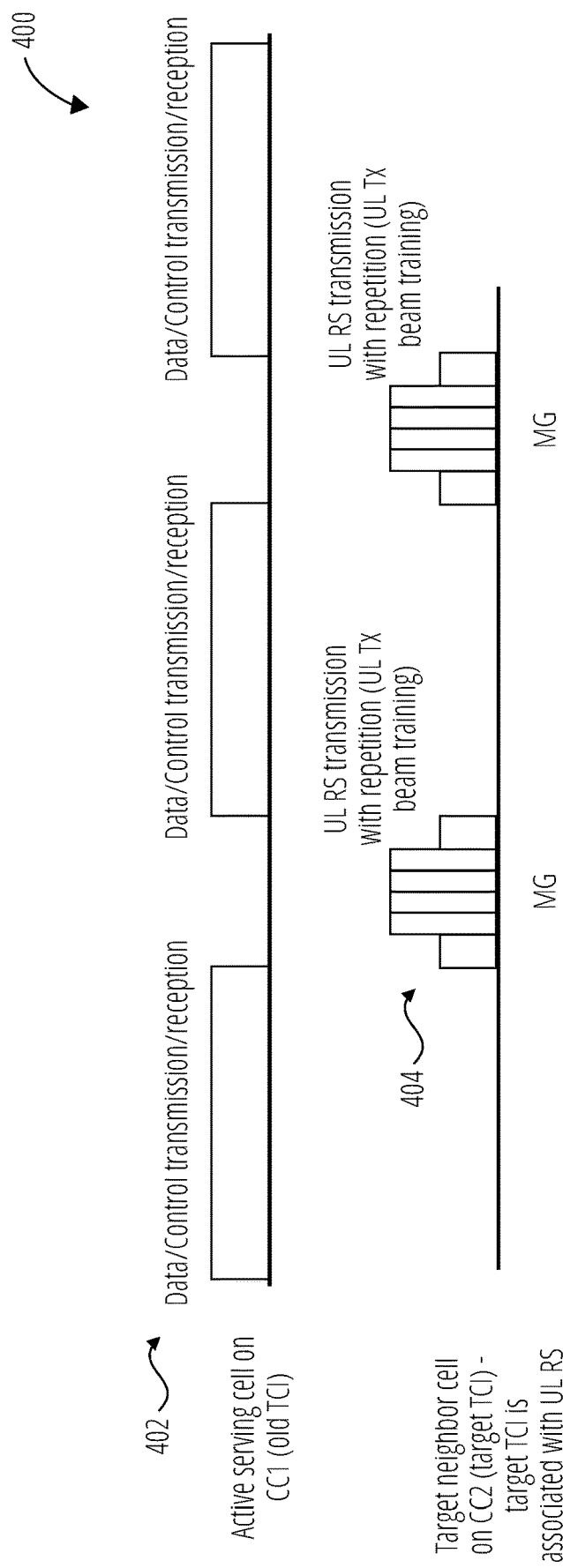
FIG. 4 illustrates an example target downlink transmission configuration indication associated with an uplink reference signal in accordance with some embodiments.

For example, FIG. 4 illustrates a transmission schedule 400 for a UE that does not support per-FR MG, the UE performing the UL RS transmission with repetition in MG in accordance with some embodiments. As shown, the UE may communicate with the active serving cell (e.g., data/control transmission or reception 402) during scheduled intervals on a first component carrier (CC1) with the old TCI.

In the MG, the UE may transmit a UL RS transmission 404 with repetition (e.g., UL Tx beam training). The UE may change to the target non-serving cell on the second component carrier and then transmit the UL RS transmission 404. The UL RS transmission 404 may include a beam sweep to determine the best UL Tx beam. The target TCI may be associated with the UL RS. Because the UE changes component carriers for the UL RS transmission 404, during the MG, the UE cannot transit or receive data or control signals with the active serving cell on the first component carrier. After the measurement gap, the UE may tune back to the first component carrier and perform data/control transmission or reception 402 before returning to the second component carrier during the MG to once again transmit the UL RS transmission 404 to the target non-serving cell.

Returning to FIG. 2, the old serving cell 204 may transmit the UL RS pattern and timing information 212 of the UE 202 to the target non-serving cell 206. The target non-serving cell 206 may receive the UL RS pattern and timing information 212 and use that information to determine when to monitor an RS from the UE 202 to receive the UL RS based Tx training reference signals 210.

Accordingly, the UE 202 may transmit the UL RS based Tx training reference signals 210. The UE may use beam sweeping for transmission of the UL RS based Tx training reference signals 210. The target non-serving cell 206 receives the configured UL RSs (e.g., UL RS based Tx training reference signals 210) from the UE 202 and determine 214 the best UL RS. For example, the target non-serving cell 206 may measure the SRS and determine which is the strongest at the network side. The UL RS based Tx training reference signals 210 may use the best UL RS to determine a beam pair for communication with the UE 202. For example, the strongest SRS may be used to determine the best Tx beam at the UE 202 and/or the best Rx beam at the target non-serving cell 206.

The target non-serving cell 206 may indicate the best UL RS or best Tx beam information 216 (e.g. UL RS index or beam index) to old serving cell. The target non-serving cell 206 may send this information to the old serving cell 204 to allow the old serving cell 204 to know the results of the measurements of the UL RS based Tx training reference signals 210. For example, if the old serving cell 204 had configured the UE 202 with eight symbols or resources for SRS, the target non-serving cell 206 may measure the SRS, determine the best SRS, and indicate to the old serving cell 204 the UL RS index or beam index of the UE associated with the best SRS.

The old serving cell 204 may transmit target neighbor cell updated information 218 to the UE 202. In some embodiments, the old serving cell 204 uses the target neighbor cell updated information 218 to indicate the best UL RS or best Tx beam information 216 to the UE 202. In other embodiments, the target neighbor cell updated information 218 configures the target TCI (i.e., the TCI for the target non-serving cell 206) with the best UL RS or best Tx beam to UE. Thus, the old serving cell 204 may indicate the best UL RS or best Tx beam information to the UE 202; or the old serving cell 204 configures the target TCI with the best UL RS or best Tx beam to UE.

The old serving cell 204 may trigger the UE 202 to switch TCIs and change the cell. For example, the old serving cell 204 may use layer 1 or layer 2 signaling to trigger the UE 202 to switch from using the TCI associated with old serving cell 204 to using the target TCI associated with the target non-serving cell 206 and cause the UE 202 to switch from the old serving cell 204 to the target non-serving cell 206. For instance, the old serving cell 204 may use DCI or MAC CE 220 to indicate to the UE 202 to switch to the target TCI and change the cell.

The UE 202 may derive 222 an Rx beam for DL reception based on the UL RS that the target non-serving cell 206 determined was the best. For example, the Rx beam may be derived based on beam correspondence. The UE may derive what the best Rx beam is to receive data from the target non-serving cell 206 based on the Tx beam associated with the best UL RS SRS. Beam correspondence may be used such that the Tx beam associated with the best UL RS SRS may also be used for the Rx beam. Similarly, the target non-serving cell 206 may derive 224 its Tx beam from the best UL RS for DL transmission using beam correspondence.

The UE 202 may use the Rx beam derived from best UL RS (beam correspondence) for DL reception and the target non-serving cell 206 may use the Tx beam derived from best UL RS (beam correspondence) for DL transmission 226.

Figure 3:
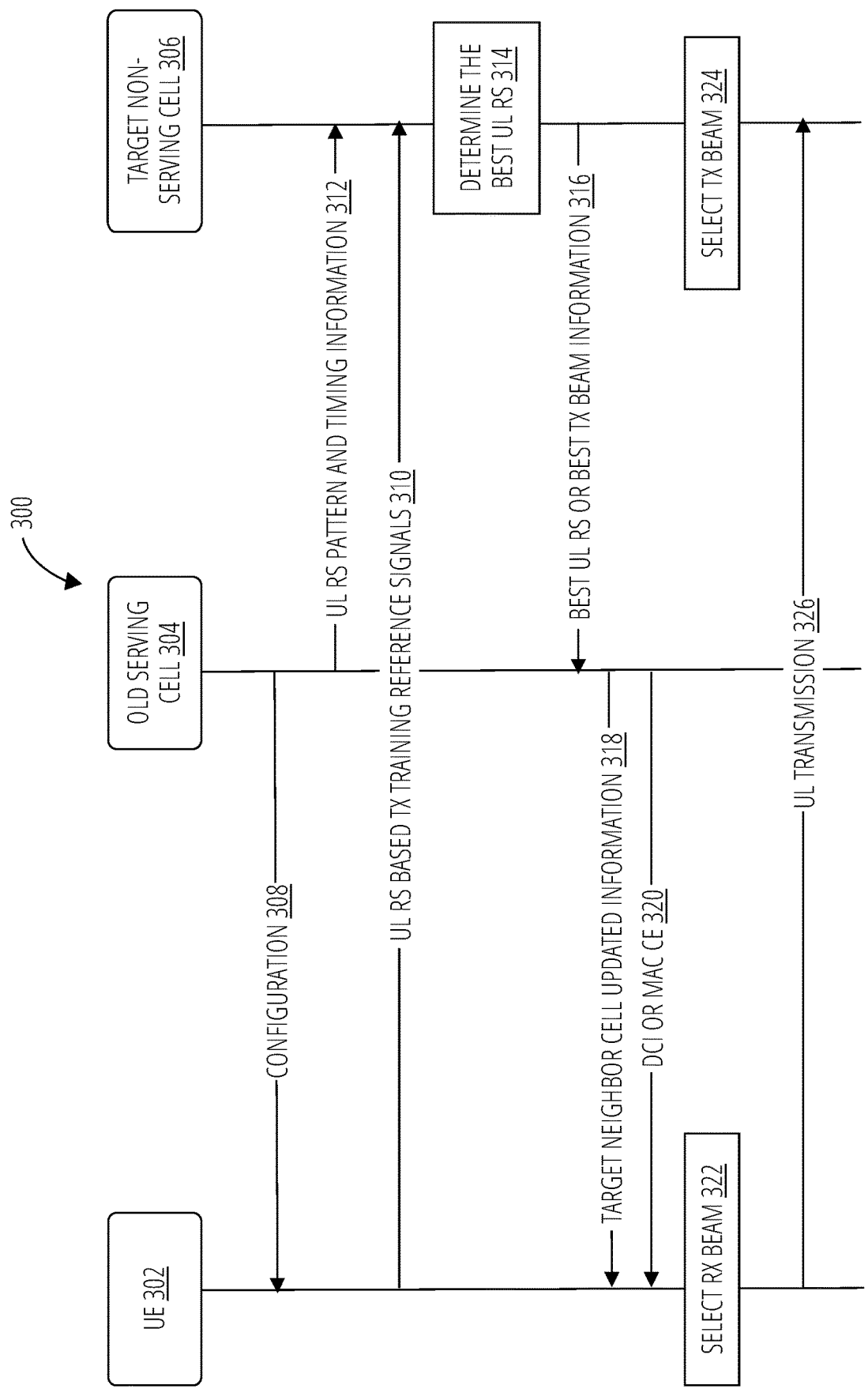
FIG. 3 illustrates a signal diagram for determining a target UL TCI associated with an UL RS in accordance with some embodiments.

FIG. 3 illustrates a signal diagram 300 for determining a target UL TCI associated with an UL RS in accordance with some embodiments. The method outlined in this signal diagram 300 may allow the network to know the UL TCI to use for a target non-serving cell 306 before triggering a cell change.

If the target TCI (e.g., UL TCI for the target non-serving cell 306) of the target non-serving cell 306 is directly or indirectly associated with a UL RS of the UE (e.g. SRS), according to one embodiment, then the following method may be performed. In a first step, the old serving cell 304 (e.g., the active serving cell) may configure the UE 302 to perform UL RS based Tx training reference signals 310 on UL to the target non-serving cell 306. For instance, as shown, the old serving cell 304 may send a configuration 308 to the UE 302. The UL RS based Tx training reference signals 310 may comprise beam sweeping using SRS on the UL. In particular, the beam sweeping may be configured to determine the best Tx beam to use for transmissions to the target non-serving cell 306. The configuration 308 may comprise UL RS pattern and/or timing information for the UE for the UL RS based Tx training reference signals 310.

The UL RS pattern and/or timing information may be adjusted based on whether an intra-frequency or an inter-frequency is used. If the target non-serving cell 306 is an intra-frequency non-serving cell or if the configured SRS is within the current UE active BWP, the UE 302 may perform the UL RS transmission with repetition (i.e., UL RS based Tx training reference signals 310) without MG (measurement gap).

If the target non-serving cell 306 is an inter-frequency non-serving cell or if the configured SRS is not within the current UE active BWP, the UE 302 may perform UL RS transmission with repetition (i.e., UL RS based Tx training reference signals 310) within MGs. The UE may switch frequencies and perform the UL RS based Tx training reference signals 310 within MGs.

The UE 302 may support per-frequency range (FR) MG. If the UE 302 supports per-FR MG, the UE 302 can perform the UL RS transmission with repetition in MG of a first FR. In this first FR, outside of the UL RS transmission with repetition in MG, no data, control transmission, or reception may be used by the UE in MG. Hover, the UE 302 may still use a second FR for used for normal data, control reception, or transmission in the MG if the UE 302 has any active serving component carrier on the second FR.

If the UE 302 does not support per-FR MG (e.g., only supports per-UE MG), the UE 302 can perform the UL RS transmission with repetition in MG and no data, control transmission, or reception is available for the UE in this MG.

For example, FIG. 4 illustrates a transmission schedule 400 for a UE that does not support per-FR MG, the UE performing the UL RS transmission with repetition in MG in accordance with some embodiments. As shown, the UE may communicate with the active serving cell (e.g., data/control transmission or reception 402) during scheduled intervals on a first component carrier (CC1) with the old TCI.

In the MG, the UE may transmit a UL RS transmission 404 with repetition (e.g., UL Tx beam training). The UE may change to the target non-serving cell on the second component carrier and then transmit the UL RS transmission 404. The UL RS transmission 404 may include a beam sweep to determine the best UL Tx beam. The target TCI may be associated with the UL RS. Because the UE changes component carriers for the UL RS transmission 404, during the MG, the UE cannot transit or receive data or control signals with the active serving cell on the first component carrier. After the measurement gap, the UE may tune back to the first component carrier and perform data/control transmission or reception 402 before returning to the second component carrier during the MG to once again transmit the UL RS transmission 404 to the target non-serving cell.

Returning to FIG. 3, the old serving cell 304 may transmit the UL RS pattern and timing information 312 of the UE 302 to the target non-serving cell 306. The target non-serving cell 306 may receive the UL RS pattern and timing information 312 and use that information to determine when to monitor an RS from the UE 302 to receive the UL RS based Tx training reference signals 310.

Accordingly, the UE 302 may transmit the UL RS based Tx training reference signals 310. The UE may use beam sweeping for transmission of the UL RS based Tx training reference signals 310. The target non-serving cell 306 receives the configured UL RSs (e.g., UL RS based Tx training reference signals 310) from the UE 302 and determine 314 the best UL RS. For example, the target non-serving cell 306 may measure the SRS and determine which is the strongest at the network side. The UL RS based Tx training reference signals 310 may use the best UL RS to determine a beam pair for communication with the UE 302. For example, the strongest SRS may be used to determine the best Tx beam at the UE 302 and/or the best Rx beam at the target non-serving cell 306.

The target non-serving cell 306 may indicate the best UL RS or best Tx beam information 316 (e.g. UL RS index or beam index) to old serving cell. The target non-serving cell 306 may send this information to the old serving cell 304 to allow the old serving cell 304 to know the results of the measurements of the UL RS based Tx training reference signals 310. For example, if the old serving cell 304 had configured the UE 302 with eight symbols or resources for SRS, the target non-serving cell 306 may measure the SRS, determine the best SRS, and indicate to the old serving cell 304 the UL RS index or beam index of the UE associated with the best SRS.

The old serving cell 304 may transmit target neighbor cell updated information 318 to the UE 302. In some embodiments, the old serving cell 304 uses the target neighbor cell updated information 318 to indicate the best UL RS or best Tx beam information 316 to the UE 302. In other embodiments, the target neighbor cell updated information 318 configures the target TCI (i.e., the TCI for the target non-serving cell 306) with the best UL RS or best Tx beam to UE. Thus, the old serving cell 304 may indicate the best UL RS or best Tx beam information to the UE 302; or the old serving cell 304 configures the target TCI with the best UL RS or best Tx beam to UE.

The old serving cell 304 may trigger the UE 302 to switch TCIs and change the cell. For example, the old serving cell 304 may use layer 1 or layer 2 signaling to trigger the UE 302 to switch from using the TCI associated with old serving cell 304 to using the target TCI associated with the target non-serving cell 306 and cause the UE 302 to switch from the old serving cell 304 to the target non-serving cell 306. For instance, the old serving cell 304 may use DCI or MAC CE 320 to indicate to the UE 302 to switch to the target TCI and change the cell.

The UE 302 may select 322 a Tx beam for UL transmission 326 based the UL RS that the target non-serving cell 306 determined was the best. For example, the UL TCI for the target non-serving cell 306 may cause the UE 302 to use the Tx beam associated with the best UL RS as determined by the target non-serving cell 306. Similarly, the target non-serving cell 306 may select 324 to use the Rx beam derived from the best UL RS for UL reception.

As previously discussed, FIG. 4 illustrates a transmission schedule 400 for a UE that does not support per-FR MG, where the UE performs the UL RS transmission with repetition in MG. In other embodiments, the UE may use an interruption based UL-RS transmission as an alternative to using MG for performing UL RS transmission with repetition (e.g., UE Tx beam training) as discussed with reference to the previous figures.

For example, some embodiments may use a scheduling restriction and a measurement restriction. These restrictions may be needed because the UE is changing its Tx beam to do Tx beam sweeping during the UE Tx beam training. Accordingly, the Tx beam would be changing from symbol to symbol. If those symbols were scheduled for uplink data or uplink controls in addition to the UL RS transmission with repetition, then the UE may be unable to perform transmissions for the uplink data or uplink controls.

Accordingly, a scheduling restriction may be used to eliminate such an UL scheduling conflict. If the target cell is an intra-frequency non-serving cell or if the configured UL-RS is within the current UE active BWP, the UE may have a scheduling restriction during the UL-RS transmission duration, and X symbols before and after this UL-RS RS transmission duration (X>=0). The X symbols may be used to prevent errors due to timing misalignment between the old serving cell and the target non-serving cell. The value that X is set to may be configured by a network, or may be established in a standard. Within the scheduling restriction duration (i.e., UL-RS transmission duration, and X symbols before and after this UL-RS RS transmission duration) the active serving cell data, control reception, and transmission is muted.

Additionally, a measurement restriction may be used to prevent interference at the old serving cell. The measurement restriction may be applied during the UL-RS transmission duration, and Y symbols before and after this UL-RS transmission duration (Y>=0). The total duration of the UL-RS transmission duration, and Y symbols before and after this UL-RS transmission duration may be referred to as the measurement restriction duration. The value that Y is set to may be configured by a network, or may be established in a standard. In some embodiments, within the measurement restriction duration the active serving cell mobility, and beam measurement or radio link monitoring (RLM) is muted.

In some embodiments, the measurement restriction may be applied differently based on UL-RS transmission type. For example, if the UL-RS is periodic or semi-periodic and UL-RS occasions are colliding with active serving cell mobility/beam measurement or RLM occasions, it may be determine if the UL-RS occasions are partially or fully overlapping with the mobility/beam measurement or RLM occasions. In some embodiments, if the occasions are partially overlapped, UL-RS may be only transmitted when on the occasions which are not overlapped with active serving cell mobility/beam measurement or RLM occasions. In some embodiments, if the occasions are fully overlapped, UL-RS may be transmitted on M overlapped occasions out of N (e.g., every N=3 UL-RS occasions, only M=1 occasions could be used for UL-RS transmission). The value that M and N are set to may be configured by a network, or may be established in a standard. In some embodiments, if UL-RS is aperiodic and the UL-RS occasions are colliding with the active serving cell mobility/beam measurement or RLM occasions, the UL-RS occasion(s) is always prioritized. That is, for aperiodic UL-RS occasions, within the measurement restriction duration the active serving cell mobility/beam measurement or RLM is muted.

In some embodiments, interruption based UL-RS transmission may be used as an alternative to using MG in inter-frequency scenarios. For example, if the target non-serving cell is an inter-frequency non-serving cell or if the configured SRS is not within the current UE active BWP, the UE may have an interruption during UL-RS transmission duration, and X symbols before and after this UL-RS RS transmission duration (X>=0). The total duration of the UL-RS transmission duration, and X symbols before and after this UL-RS transmission duration may be referred to as the interruption duration. Further, in some embodiments, within the interruption duration the whole UE cell data and control reception/transmission on all active serving CCs and active serving cell mobility/beam measurement or RLM may be muted if the UE only supports per-UE MG. In some embodiments, within interruption duration the active serving cell data and control reception/transmission and active serving cell mobility/beam measurement or RLM is muted in the same FR as the UL-RS's if the UE can support per-FR MG.

Figure 5:
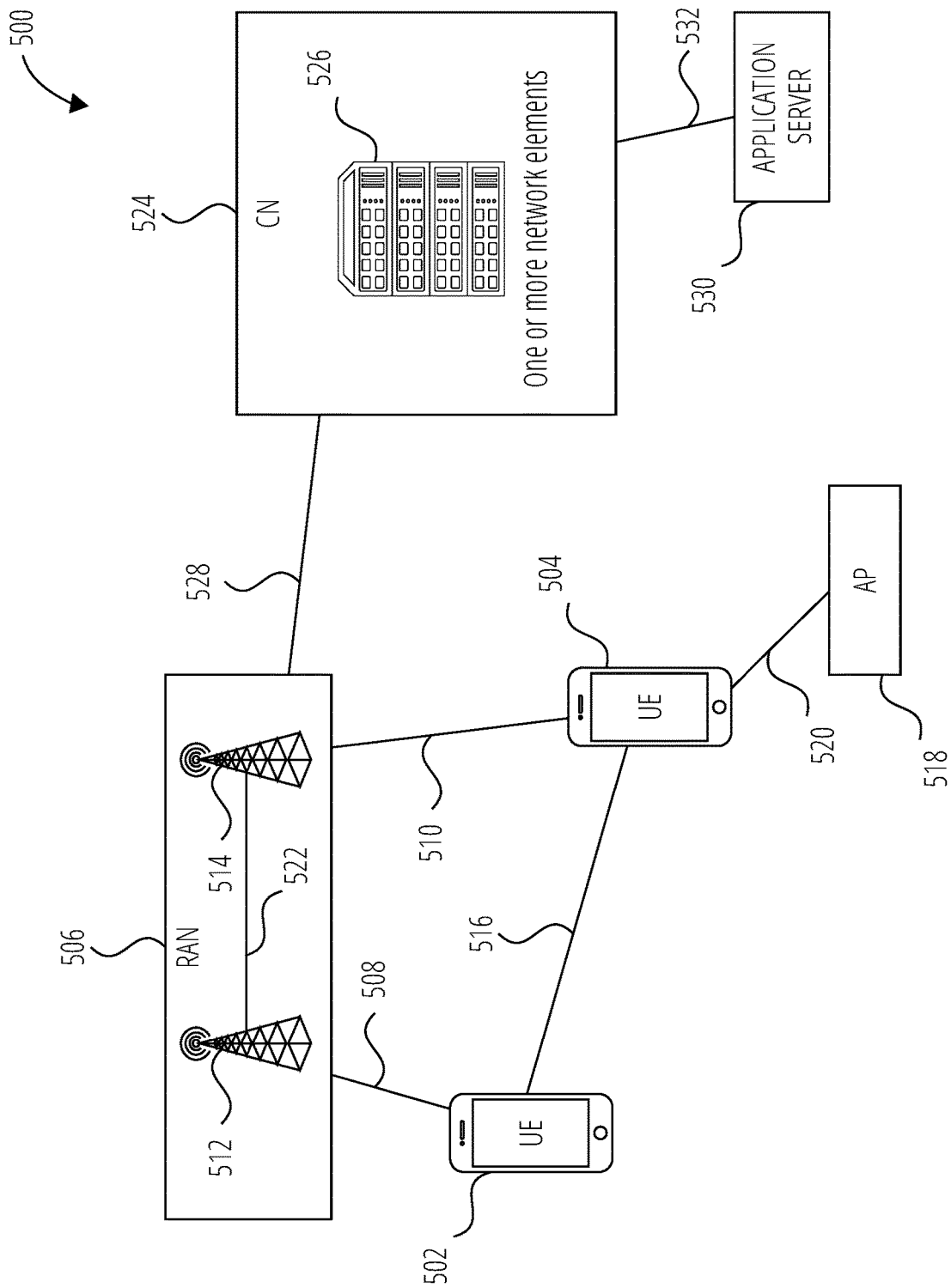
FIG. 5 illustrates an example architecture of a wireless communication system, according to embodiments disclosed herein.

FIG. 5 illustrates an example architecture of a wireless communication system 500, according to embodiments disclosed herein. The following description is provided for an example wireless communication system 500 that operates in conjunction with the LTE system standards and/or 5G or NR system standards as provided by 3GPP technical specifications.

As shown by FIG. 5, the wireless communication system 500 includes UE 502 and UE 504 (although any number of UEs may be used). In this example, the UE 502 and the UE 504 are illustrated as smartphones (e.g., handheld touchscreen mobile computing devices connectable to one or more cellular networks), but may also comprise any mobile or non-mobile computing device configured for wireless communication.

The UE 502 and UE 504 may be configured to communicatively couple with a RAN 506. In embodiments, the RAN 506 may be NG-RAN, E-UTRAN, etc. The UE 502 and UE 504 utilize connections (or channels) (shown as connection 508 and connection 510, respectively) with the RAN 506, each of which comprises a physical communications interface. The RAN 506 can include one or more base stations, such as base station 512 and base station 514, that enable the connection 508 and connection 510.

In this example, the connection 508 and connection 510 are air interfaces to enable such communicative coupling, and may be consistent with RAT(s) used by the RAN 506, such as, for example, an LTE and/or NR.

In some embodiments, the UE 502 and UE 504 may also directly exchange communication data via a sidelink interface 516. The UE 504 is shown to be configured to access an access point (shown as AP 518) via connection 520. By way of example, the connection 520 can comprise a local wireless connection, such as a connection consistent with any IEEE 802.11 protocol, wherein the AP 518 may comprise a Wi-Fi® router. In this example, the AP 518 may be connected to another network (for example, the Internet) without going through a CN 524.

In embodiments, the UE 502 and UE 504 can be configured to communicate using orthogonal frequency division multiplexing (OFDM) communication signals with each other or with the base station 512 and/or the base station 514 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 512 or base station 514 may be implemented as one or more software entities running on server computers as part of a virtual network. In addition, or in other embodiments, the base station 512 or base station 514 may be configured to communicate with one another via interface 522. In embodiments where the wireless communication system 500 is an LTE system (e.g., when the CN 524 is an EPC), the interface 522 may be an X2 interface. The X2 interface may be defined between two or more base stations (e.g., two or more eNBs and the like) that connect to an EPC, and/or between two eNBs connecting to the EPC. In embodiments where the wireless communication system 500 is an NR system (e.g., when CN 524 is a 5GC), the interface 522 may be an Xn interface. The Xn interface is defined between two or more base stations (e.g., two or more gNBs and the like) that connect to SGC, between a base station 512 (e.g., a gNB) connecting to 5GC and an eNB, and/or between two eNBs connecting to 5GC (e.g., CN 524).

The RAN 506 is shown to be communicatively coupled to the CN 524. The CN 524 may comprise one or more network elements 526, which are configured to offer various data and telecommunications services to customers/subscribers (e.g., users of UE 502 and UE 504) who are connected to the CN 524 via the RAN 506. The components of the CN 524 may be implemented in one physical device or separate physical devices including components to read and execute instructions from a machine-readable or computer-readable medium (e.g., a non-transitory machine-readable storage medium).

In embodiments, the CN 524 may be an EPC, and the RAN 506 may be connected with the CN 524 via an S1 interface 528. In embodiments, the S1 interface 528 may be split into two parts, an S1 user plane (S1-U) interface, which carries traffic data between the base station 512 or base station 514 and a serving gateway (S-GW), and the S1-MME interface, which is a signaling interface between the base station 512 or base station 514 and mobility management entities (MMEs).

In embodiments, the CN 524 may be a 5GC, and the RAN 506 may be connected with the CN 524 via an NG interface 528. In embodiments, the NG interface 528 may be split into two parts, an NG user plane (NG-U) interface, which carries traffic data between the base station 512 or base station 514 and a user plane function (UPF), and the S1 control plane (NG-C) interface, which is a signaling interface between the base station 512 or base station 514 and access and mobility management functions (AMFs).

Generally, an application server 530 may be an element offering applications that use internet protocol (IP) bearer resources with the CN 524 (e.g., packet switched data services). The application server 530 can also be configured to support one or more communication services (e.g., VoIP sessions, group communication sessions, etc.) for the UE 502 and UE 504 via the CN 524. The application server 530 may communicate with the CN 524 through an IP communications interface 532.

Figure 6:
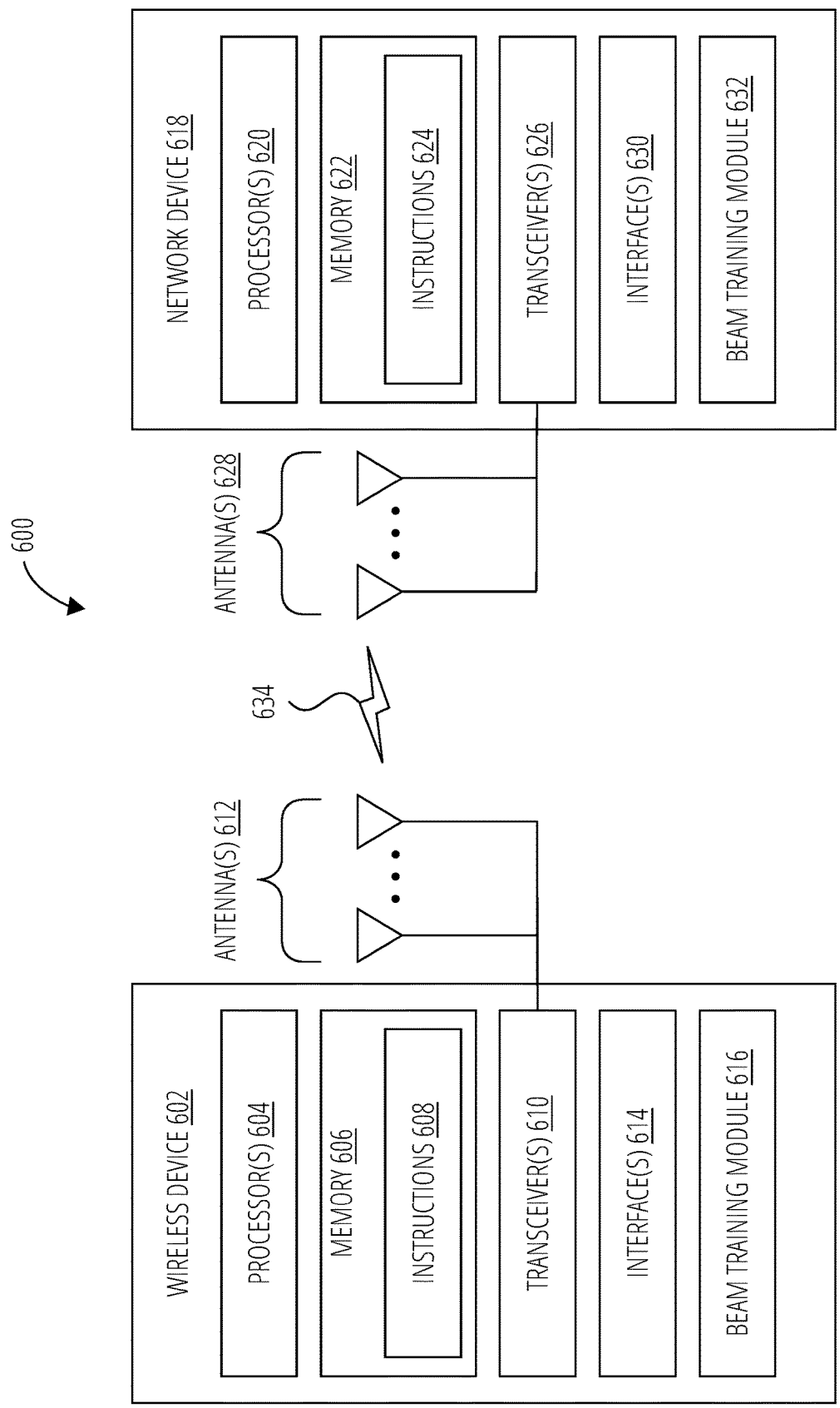
FIG. 6 illustrates a system for performing signaling between a wireless device and a network device, according to embodiments disclosed herein.

FIG. 6 illustrates a system 600 for performing signaling 634 between a wireless device 602 and a network device 618, according to embodiments disclosed herein. The system 600 may be a portion of a wireless communications system as herein described. The wireless device 602 may be, for example, a UE of a wireless communication system. The network device 618 may be, for example, a base station (e.g., an eNB or a gNB) of a wireless communication system.

The wireless device 602 may include one or more processor(s) 604. The processor(s) 604 may execute instructions such that various operations of the wireless device 602 are performed, as described herein. The processor(s) 604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 602 may include a memory 606. The memory 606 may be a non-transitory computer-readable storage medium that stores instructions 608 (which may include, for example, the instructions being executed by the processor(s) 604). The instructions 608 may also be referred to as program code or a computer program. The memory 606 may also store data used by, and results computed by, the processor(s) 604.

The wireless device 602 may include one or more transceiver(s) 610 that may include radio frequency (RF) transmitter and/or receiver circuitry that use the antenna(s) 612 of the wireless device 602 to facilitate signaling (e.g., the signaling 634) to and/or from the wireless device 602 with other devices (e.g., the network device 618) according to corresponding RATs.

The wireless device 602 may include one or more antenna(s) 612 (e.g., one, two, four, or more). For embodiments with multiple antenna(s) 612, the wireless device 602 may leverage the spatial diversity of such multiple antenna(s) 612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 602 may be accomplished according to precoding (or digital beamforming) that is applied at the wireless device 602 that multiplexes the data streams across the antenna(s) 612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 602 may implement analog beamforming techniques, whereby phases of the signals sent by the antenna(s) 612 are relatively adjusted such that the (joint) transmission of the antenna(s) 612 can be directed (this is sometimes referred to as beam steering).

The wireless device 602 may include one or more interface(s) 614. The interface(s) 614 may be used to provide input to or output from the wireless device 602. For example, a wireless device 602 that is a UE may include interface(s) 614 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 610/antenna(s) 612 already described) that allow for communication between the UE and other devices and may operate according to known protocols (e.g., Wi-Fi®, Bluetooth®, and the like).

The wireless device 602 may include a beam training module 616. The beam training module 616 may be implemented via hardware, software, or combinations thereof. For example, the beam training module 616 may be implemented as a processor, circuit, and/or instructions 608 stored in the memory 606 and executed by the processor(s) 604. In some examples, the beam training module 616 may be integrated within the processor(s) 604 and/or the transceiver(s) 610. For example, the beam training module 616 may be implemented by a combination of software components (e.g., executed by a DSP or a general processor) and hardware components (e.g., logic gates and circuitry) within the processor(s) 604 or the transceiver(s) 610.

The beam training module 616 may be used for various aspects of the present disclosure.

The network device 618 may include one or more processor(s) 620. The processor(s) 620 may execute instructions such that various operations of the network device 618 are performed, as described herein. The processor(s) 620 may include one or more baseband processors implemented using, for example, a CPU, a DSP, an ASIC, a controller, an FPGA device, another hardware device, a firmware device, or any combination thereof configured to perform the operations described herein.

The network device 618 may include a memory 622. The memory 622 may be a non-transitory computer-readable storage medium that stores instructions 624 (which may include, for example, the instructions being executed by the processor(s) 620). The instructions 624 may also be referred to as program code or a computer program. The memory 622 may also store data used by, and results computed by, the processor(s) 620.

The network device 618 may include one or more transceiver(s) 626 that may include RF transmitter and/or receiver circuitry that use the antenna(s) 628 of the network device 618 to facilitate signaling (e.g., the signaling 634) to and/or from the network device 618 with other devices (e.g., the wireless device 602) according to corresponding RATs.

The network device 618 may include one or more antenna(s) 628 (e.g., one, two, four, or more). In embodiments having multiple antenna(s) 628, the network device 618 may perform MIMO, digital beamforming, analog beamforming, beam steering, etc., as has been described.

The network device 618 may include one or more interface(s) 630. The interface(s) 630 may be used to provide input to or output from the network device 618. For example, a network device 618 that is a base station may include interface(s) 630 made up of transmitters, receivers, and other circuitry (e.g., other than the transceiver(s) 626/antenna(s) 628 already described) that enables the base station to communicate with other equipment in a core network, and/or that enables the base station to communicate with external networks, computers, databases, and the like for purposes of operations, administration, and maintenance of the base station or other equipment operably connected thereto.

The network device 618 may include a beam training module 632. The beam training module 632 may be implemented via hardware, software, or combinations thereof. For example, the beam training module 632 may be implemented as a processor, circuit, and/or instructions 624 stored in the memory 622 and executed by the processor(s) 620. In some examples, the beam training module 632 may be integrated within the processor(s) 620 and/or the transceiver(s) 626. For example, the beam training module 632 may be implemented by a combination of software components (e.g., executed by a DSP or a general processor) and hardware components (e.g., logic gates and circuitry) within the processor(s) 620 or the transceiver(s) 626.

The beam training module 632 may be used for various aspects of the present disclosure.

Embodiments contemplated herein include an apparatus comprising means to perform one or more elements of the methods disclosed herein. This apparatus may be, for example, an apparatus of a UE (such as a wireless device 602 that is a UE, as described herein).

Embodiments contemplated herein include one or more non-transitory computer-readable media comprising instructions to cause an electronic device, upon execution of the instructions by one or more processors of the electronic device, to perform one or more elements of the methods disclosed herein. This non-transitory computer-readable media may be, for example, a memory of a UE (such as a memory 606 of a wireless device 602 that is a UE, as described herein).

Embodiments contemplated herein include an apparatus comprising logic, modules, or circuitry to perform one or more elements of the methods disclosed herein. This apparatus may be, for example, an apparatus of a UE (such as a wireless device 602 that is a UE, as described herein).

Embodiments contemplated herein include an apparatus comprising: one or more processors and one or more computer-readable media comprising instructions that, when executed by the one or more processors, cause the one or more processors to perform one or more elements of the methods disclosed here. This apparatus may be, for example, an apparatus of a UE (such as a wireless device 602 that is a UE, as described herein).

Embodiments contemplated herein include a signal as described in or related to one or more elements of the methods disclosed herein.

Embodiments contemplated herein include a computer program or computer program product comprising instructions, wherein execution of the program by a processor is to cause the processor to carry out one or more elements of the methods disclosed herein. The processor may be a processor of a UE (such as a processor(s) 604 of a wireless device 602 that is a UE, as described herein). These instructions may be, for example, located in the processor and/or on a memory of the UE (such as a memory 606 of a wireless device 602 that is a UE, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), the method comprising:
   receiving, from an active serving cell, a configuration to perform uplink (UL) reference signal (RS) based transmit (Tx) beam training with a target non-serving cell;
   transmitting an UL RS with repetition using beam sweeping according to the configuration;
   receiving, from the active serving cell, Tx beam information from the UL RS based Tx beam training based on measurements by the target non-serving cell;
   receiving, from the active serving cell, an indication to switch to a target transmission configuration indication (TCI) and change to the target non-serving cell; and
   using a receive (Rx) beam selected based on the measurements by the target non-serving cell for downlink (DL) reception from the target non-serving cell.

2. The method of claim 1, further comprising deriving the Rx beam from a Tx beam associated with a best UL RS measurement using beam correspondence.

3. The method of claim 1, wherein the UL RS comprises a sounding reference signal (SRS).

4. The method of claim 1, wherein the Tx beam information comprises best UL RS or best Tx beam information as measured by the target non-serving cell.

5. The method of claim 1, wherein the Tx beam information comprise a configuration for the target TCI with a best UL RS or a best Tx beam as measured by the target non-serving cell.

6. The method of claim 1, wherein when the target non-serving cell is an inter-frequency non-serving cell or if the configured UL RS is not within a current UE active bandwidth part (BWP), the UL RS is transmitted within a measurement gap (MG).

7. The method of claim 1, further comprising using a Tx beam associated with a best UL RS measurement for UL transmission with the target non-serving cell.

8. The method of claim 1, further comprising using a scheduling during an UL RS transmission duration and X symbols before and after the UL RS transmission duration, where X is a value greater than zero.

9. An apparatus for a user equipment (UE), comprising:
   a memory configured to store a configuration to perform uplink (UL) reference signal (RS) based transmit (Tx) beam training; and
   one or more processors configured to cause the UE to:
      receive, from an active serving cell, the configuration to perform UL RS based Tx beam training with a target non-serving cell;
      transmit an UL RS with repetition using beam sweeping according to the configuration;
      receive, from the active serving cell, Tx beam information from the UL RS based Tx beam training based on measurements by the target non-serving cell;
      receive, from the active serving cell, an indication to switch to a target transmission configuration indication (TCI) and change to the target non-serving cell; and
      use a receive (Rx) beam selected based on the measurements by the target non-serving cell for downlink (DL) reception from the target non-serving cell.

10. The apparatus of claim 9, wherein the one or more processors are further configured to derive the Rx beam from a Tx beam associated with a best UL RS measurement using beam correspondence.

11. The apparatus of claim 9, wherein the UL RS comprises a sounding reference signal (SRS).

12. The apparatus of claim 9, wherein the Tx beam information comprises best UL RS or best Tx beam information as measured by the target non-serving cell.

13. The apparatus of claim 9, wherein the Tx beam information comprise a configuration for the target TCI with a best UL RS or a best Tx beam as measured by the target non-serving cell.

14. The apparatus of claim 9, wherein when the target non-serving cell is an inter-frequency non-serving cell or if the configured UL RS is not within a current UE active bandwidth part (BWP), the UL RS is transmitted within a measurement gap (MG).

15. The apparatus of claim 9, wherein the one or more processors are further configured to use a Tx beam associated with a best UL RS measurement for UL transmission with the target non-serving cell.

16. The apparatus of claim 9, wherein the one or more processors are further configured to use a scheduling during an UL RS transmission duration and X symbols before and after the UL RS transmission duration, where X is a value greater than zero.

17. A non-transitory computer-readable storage medium including instructions that, when executed by one or more processors of a user equipment (UE), cause the UE to:
   receive, from an active serving cell, a configuration to perform uplink (UL) reference signal (RS) based transmit (Tx) beam training with a target non-serving cell;
   transmit an UL RS with repetition using beam sweeping according to the configuration;
   receive, from the active serving cell, Tx beam information from the UL RS based Tx beam training based on measurements by the target non-serving cell;
   receive, from the active serving cell, an indication to switch to a target transmission configuration indication (TCI) and change to the target non-serving cell; and
   use a receive (Rx) beam selected based on the measurements by the target non-serving cell for downlink (DL) reception from the target non-serving cell.

18. The non-transitory computer-readable storage medium of claim 17, wherein the instructions further cause the UE to derive the Rx beam from a Tx beam associated with a best UL RS measurement using beam correspondence.

19. The non-transitory computer-readable storage medium of claim 17, wherein the UL RS comprises a sounding reference signal (SRS).

20. The non-transitory computer-readable storage medium of claim 17, wherein the Tx beam information comprises best UL RS or best Tx beam information as measured by the target non-serving cell.

* * * * *